United States Patent [19]
Yamanoi

[11] Patent Number: 5,326,043
[45] Date of Patent: Jul. 5, 1994

[54] SEAT BELT RETRACTOR

[75] Inventor: Toshimi Yamanoi, Isehara, Japan

[73] Assignee: Nissan Motor Co., Ltd., Yokohama, Japan

[21] Appl. No.: 19,482

[22] Filed: Feb. 19, 1993

[30] Foreign Application Priority Data

Feb. 26, 1992 [JP] Japan .................. 4-038244

[51] Int. Cl.⁵ .............................. B60R 22/46
[52] U.S. Cl. .................. 242/396.5; 242/381.4; 242/374
[58] Field of Search ............ 242/107, 107.2, 107.4 A, 242/107.4 B, 107.4 C; 280/806; 297/478, 480

[56] References Cited

U.S. PATENT DOCUMENTS 4,522,350  6/1985  Ernst ................ 242/107.4 A
5,195,694  3/1993  Watanabe et al. ............ 242/107

OTHER PUBLICATIONS

BMW Repair Manual, 1988.

Primary Examiner—John M. Jillions
Attorney, Agent, or Firm—Lowe, Price, LeBlanc & Becker

[57] ABSTRACT

A seat belt retractor for an automotive seat belt includes a housing having a spool arranged therein for winding the seat belt therearound. The seat belt passes between fixed and movable clamp portions arranged within the housing such that, under a condition where a collision sensor activates a pretensioner for tightening the seat belt in an emergency, the movable clamp is moved toward the fixed clamp for applying squeezing pressure to the seat belt to prevent extraction thereof from the retractor housing. The pretensioner may include a gas generator which pressurizes a cylinder so as to move a piston mounted within the cylinder very rapidly. The piston is operatively connected with the movable clamp and the spool via a wire for effecting substantially instantaneous clamping of the seat belt.

11 Claims, 3 Drawing Sheets

SEAT BELT RETRACTOR

BACKGROUND OF THE INVENTION

1. Field of The Invention

The present invention relates generally to a retractor for an automotive seat belt. Specifically, the present invention relates to an automotive seat belt retractor in which extraction of the seat belt is effectively prevented for increasing vehicle safety.

2. Description of The Prior Art

Seat belt retractors are well known which comprise a housing having therein a pretensioner associated with a collision sensor for instantaneously tightening a vehicle occupant's seat belt in the event of collision. The pretensioner commonly comprises a gas cylinder which discharges a gas for rapidly moving a piston within the cylinder, the piston being operatively connected, via a wire, for example, with a spool on which a seat belt is wound for instantaneously tightening the seat belt around the seat occupant.

Further provided within the housing is a clamp for gripping the seat belt, after activation of the pretensioner, for preventing extraction of the seat belt from the housing of the retractor for securely holding a vehicle occupant in the vehicle seat under an emergency condition such as a collision. Such a clamp comprises a fixed portion mounted in the housing and a movable portion which is mounted on a pivotal axis. The seat belt is interposed between the movable and fixed portions of the clamp such that when the pretensioner is activated, the spool winding the belt is moved in the winding direction for tightening the seat belt, then, according to inertial force of a thus restrained vehicle occupant against the seat belt, a free end of the movable portion is caused to rotate, on arm portions attached thereto, in the direction of the fixed portion of the clamp to apply squeezing pressure to the seat belt to prevent extraction thereof. A guide hole may be provided in the housing engaging a projecting end of a roller shaft provided on the free end so as to stabilize movement of the free end. Further, a 'return spring' may be provided for maintaining a position of the roller shaft when the retractor is normally used. Thus overall vehicle safety is enhanced by provision of such an arrangement.

One such conventional seat belt retractor arrangement is disclosed in the BMW Repair Manual, 1988.

In such arrangements, the steps of detection of collision by the collision sensor, activation of the pretensioner, tightening of the seat belt, and clamping of the seat belt, occur consecutively and, it is possible that the seat belt may be extracted from the seat belt retractor by a small degree, such as 20–30 mm before effective clamping is established. As the seat belt may be subjected to considerable inertial force during collision, is always desirable to further enhance the locking features of restraint systems such as seat belt retractors.

SUMMARY OF THE INVENTION

It is therefore a principal object of the present invention to overcome the drawbacks of the prior art.

It is a further object of the present invention to provide a seat belt retractor which can surely prevent extraction of a seat belt by simultaneously clamping the seat belt and locking a spool on which the seat belt is wound, after operation of a seat belt pretensioner.

In order to accomplish the aforementioned and other objects, a seat belt retractor is provided, comprising: a housing, a spool rotatably mounted within the housing and utilized for winding thereon a seat belt webbing, pretensioning means active to generate driving force substantially instantaneously in response to a predetermined condition, first connecting means between the pretensioning means and the spool so disposed as to convert driving force generated by the pretensioning means into rotational energy for the spool, clamping means active to permit winding and unwinding of the seat belt webbing in a first state and to clamp the seat belt webbing against movement in a predetermined direction in a second state, and second connecting means between the pretensioning means and the clamping means and so disposed as to place the clamping means in the second state in response to generation of driving force by the pretensioning means.

DESCRIPTION OF THE PREFERRED EMBODIMENT

Figure 1:
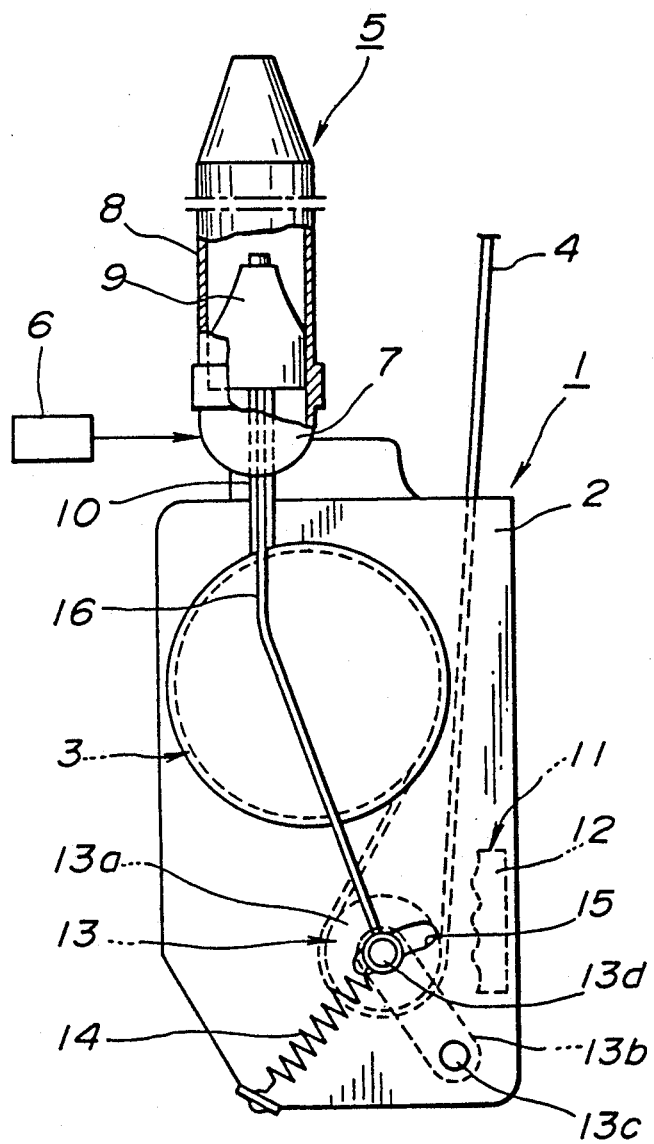
FIG. 1 is a cross-sectional view of a preferred embodiment of a seat belt retractor according to the invention.
Figure 2:
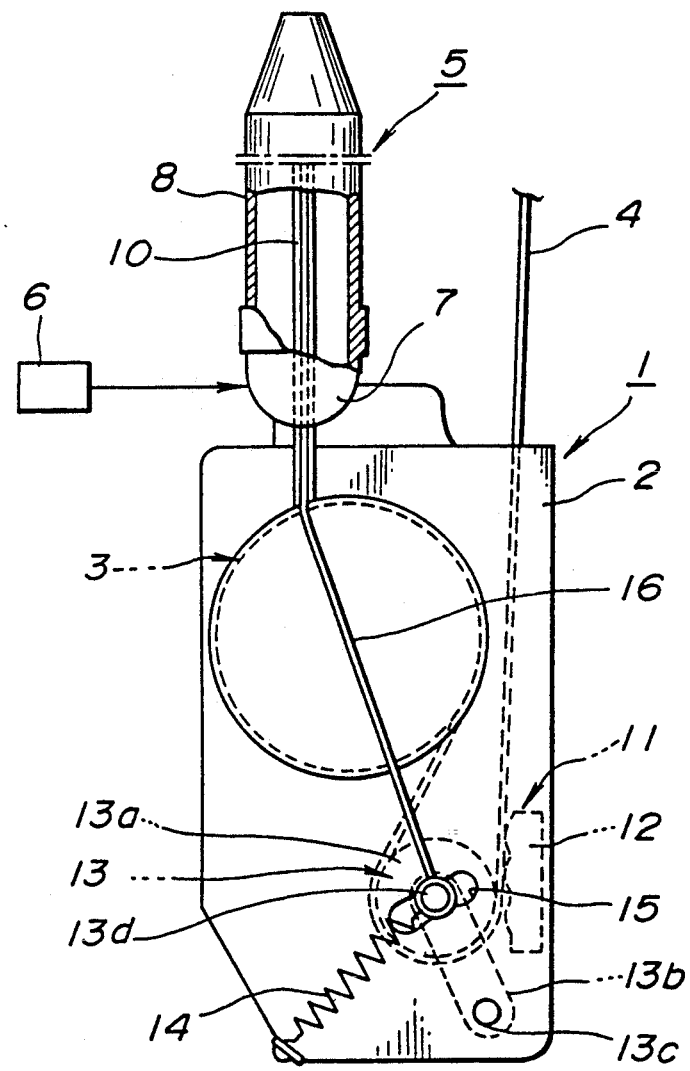
FIG. 2 is a cross-sectional view of the seat belt retractor of FIG. 1 in an operational state.

Referring now to the drawings, particularly to FIGS. 1 and 2, a seat belt retractor 1 according to the present invention comprises a housing 2, a collision sensor 6, a pretensioner 5 including a gas generator 7, a piston 9 movably disposed in a cylinder 8, spool 3 for winding a seat belt 4 thereon. The piston 9 is connected to the spool 3 by a spool winding wire 10 for applying turning force to the spool 3 in the winding direction upon activation of the pretensioner 5. Also provided in the housing 2 are a fixed clamp member 12 and a movable clamp member 13 disposed such that the seat belt 4 passes therebetween when winding on the spool 3.

When the piston 9 of the pretensioner 5 is activated, turning force is applied to the spool 3 in the winding direction thereof via the spool winding wire 10. Also, the movable clamp member 13 is moved toward the fixed clamp member 12 via a clamp wire 16 attached ato the piston 9 of the pretensioner 5, so as to tightly squeeze the seat belt 4 therebetween. The clamp members 12 and 13 of the clamp arrangement 11 of the present invention may be configured basically the same as clamp arrangements known from the prior art.

Figure 4:
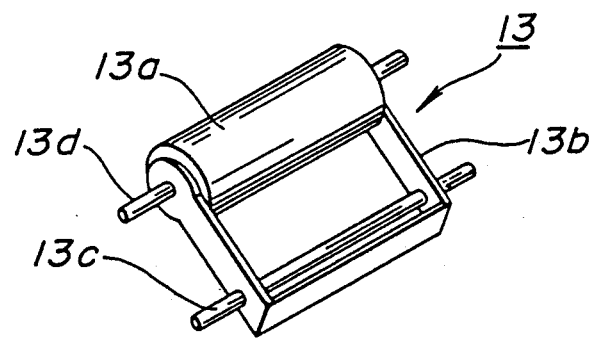
FIG. 4 a perspective view of one example of a movable clamp member which may be utilized with the seat belt retractor of the invention.

As seen in FIG. 4, the movable clamp member 13 of the clamp arrangement 11 of the present invention is the same as well known configurations, and features a mount shaft 13c serving as a pivotal axis of the movable member 13, a bracket portion 13b having sides thereof extending in parallel, outwardly from the mounting shaft 13c and mounting therebetween a roller shaft 13d on which a roller 13a is disposed. The ends of the roller shaft 13d project through guide openings 15 provided in the housing 2.

However, according to the invention, and as stated above, the piston 9 of the pretensioner 5 is connected, via a clamp wire 16, with the roller shaft 13d of the movable clamp member 13, such that movement of the piston 9 forcefully moves the roller 13a of the movable clamp member 13 into contact with the fixed clamp member 12, which is mounted in the housing 2 so as to oppose the movable clamp member 13. As may be appreciated by comparing FIGS. 1 and 2, a length of the clamp wire 16 may be chosen such that completion of winding operation of the spool winding wire 10 is effected, after which a spool locking arrangement (not shown) locks the spool 3 to prevent movement in an extraction direction thereof, before the movable clamp member 13 is acted upon by the clamp wire 16. Thus clamping is effectively established at the time of locking.

According to the above-described construction, at a time when the collision sensor 6 detects a collision, sudden braking of the vehicle, or the like, the gas generator 7 of the pretensioner is activated such that the gas pressure drives the piston 9 to move within the cylinder 8, pulling on the spool winding wire 10 to turn the spool 3 in the winding direction for quickly winding a portion of the seat belt 4 thereon for tightening the seat belt 4, after completion of turning of the spool 3 in the retraction direction by the movement of the piston 9, a spool locking arrangement (not shown) is active to prevent turning of the spool 3 in the extraction direction.

At this time, the movement of the piston 9 pulls on the clamp wire 16 such that activation of the clamp arrangement 11 is accomplished and clamping of the seat belt 4 is effected together with locking of the spool 3.

As with conventional arrangements, the movable clamp member 13 may be further provided with a return spring 14 connected between the roller shaft 13d and an inner wall of the housing 2 to maintain a normal in-use position of the movable clamp member 13 under normal conditions. However, even with the provision of a return spring 14, the movable clamp member 13 may be quickly moved toward the fixed clamp member 12 to the clamp arrangement 11 clamping the seat belt 4 such that secure clamping is quickly established.

Figure 3:
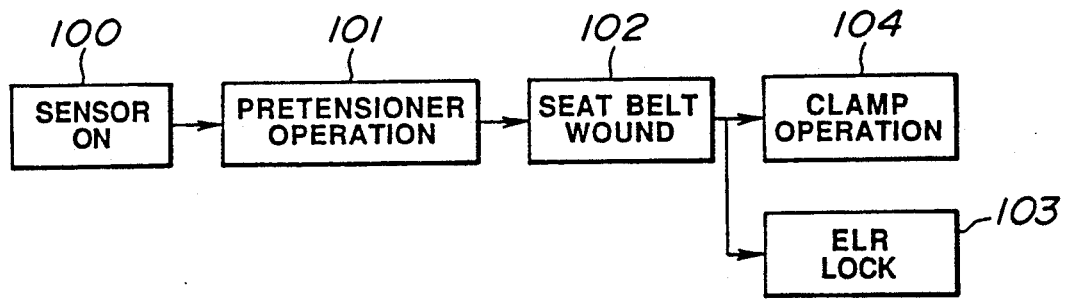
FIG. 3 is a timing chart for controlling operation of the seat belt retractor of the invention.

FIG. 3 shows a timing chart explaining operation of the seat belt retractor of the invention.

Referring to FIG. 3, at a step 100, an emergency condition such as sudden braking, collision, etc., is detected by the collision sensor 6 causing the sensor 6 to become ON. Then, at a step 101, the pretensioner is activated for tightening the seat belt 4 by turning the spool 3 of the seat belt retractor 1 in the winding direction. Next, at a step 102, completion of seat belt winding is accomplished and then, in step 103 locking of the spool 3 is accomplished effected by a spool locking arrangement (not shown), and simultaneously, by pulling of the clamp wire 16, clamping of the seat belt 4 between the movable member 13 and the fixed member 12 of the clamp arrangement 11 is effected in a step 104.

Thus according to the above-described embodiment, two stage security of the retracted seat belt 4 is established, first by clamping of the seat belt 4 by the clamp members 12 and 13, and secondly by simultaneous locking of the spool 3 of the retractor 1. Since these two restraint operations are carried out at the same time, movement of the seat belt 4 in the extraction direction during vehicle collision is surely prevented and vehicular safety is enhanced.

Also, referring to the timing chart of FIG. 3, there is no time, between activation of the pretensioner and securing of locking of the spool 3 by the locking arrangement therefor, during which inertial force may cause extraction of the seat belt 4 since the piston 9 of the pretensioner 5 also enables the clamping arrangement 11.

Further, while the above embodiment is disclosed in terms of a roller type movable clamp member 13, any other form of clamp may be employed, such as a pivotally mounted fixed headed clamp, an arm type clamp, or the like.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A seat belt retractor, comprising:

a housing;

a spool rotatably mounted within said housing and utilized for winding thereon a seat belt webbing;

pretensioning means active to generate driving force substantially instantaneously in response to a predetermined condition;

first connecting means between said pretensioning means and said spool so disposed as to convert driving force generated by said pretensioning means into rotational energy for said spool;

clamping means active to permit winding and unwinding of said seat belt webbing in a first state and to clamp said seat belt webbing against movement in a predetermined direction in a second state; and second connecting means attached to said clamping means and so disposed as to move said clamping means to said second state in response to generation of driving force by said pretensioning means.

2. A seat belt retractor as set forth in claim 1, wherein said predetermined condition is an ON state of an emergency condition detecting means connected to said pretensioning means.

3. A seat belt retractor as set forth in claim 2, wherein said emergency condition detecting means is a collision sensor.

4. A seat belt retractor as set forth in claim 1, wherein said pretensioning means comprise a pressure generating means for pressurizing a cylinder such that a piston disposed in said cylinder is rapidly moved within said cylinder, said piston being connected to said first and second connecting means.

5. A seat belt retractor as set forth in claim 1, wherein said spool is further associated with locking means active to prevent rotation of said spool in a predetermined direction after said first connecting means acts on said spool.

6. A seat belt retractor as set forth in claim 1, wherein said pretensioning means is oriented in a direction opposite the direction of movement of said movable clamping member.

7. A seat belt retractor, comprising:

a housing;

a spool rotatably mounted within said housing and utilized for winding thereon a seat belt webbing;

pretensioning means active to generate driving force substantially instantaneously in response to a predetermined condition;

first connecting means between said pretensioning means and said spool so disposed as to convert driving force generated by said pretensioning means into rotational energy for said spool;

clamping means active to permit winding and unwinding of said seat belt webbing in a first state and to clamp said seat belt webbing against movement in a predetermined direction in a second state; and second connecting means between said pretensioning means and said clamping means and so disposed as to place said clamping means in a second state in response to generation of driving force by said pretensioning means, wherein said clamping means comprises a first movable clamping member and a second fixed clamping member, said second connecting means attached to said first movable clamping member and operable to move said first movable clamping member in the direction of said second fixed clamping member according to activation of said pretensioning means.

8. A seat belt retractor as set forth in claim 7, wherein said housing further includes a guide opening receiving a projecting end of a roller shaft of said movable clamping means so as to stablize movement of said movable clamping means.

9. A seat belt retractor as set forth in claim 7, wherein said first and second connecting means are wires.

10. A seat belt retractor as set forth in claim 9, wherein a length of said second connecting means is selected such that said first connecting means is completely extended before said second connecting means acts on said movable clamping member.

11. A seat belt retractor, comprising:

a housing;

a spool rotatably mounted within said housing and utilized for winding thereon a seat belt webbing;

pretensioning means active to generate driving force substantially instantaneously in response to a predetermined condition;

first connecting means between said pretensioning means and said spool so disposed as to convert driving force generated by said pretensioning means into rotational energy for said spool;

clamping means active to permit winding and unwinding of said seat belt webbing in a first state and to clamp said seat belt webbing against movement in a predetermined direction in a second state; and second connecting means between said pretensioning means and said clamping means and so disposed as to place said clamping means in said second state in response to generation of driving force by said pretensioning means, wherein said pretensioning means comprises a pressure generating means for pressurizing a cylinder such that a piston disposed in said cylinder is rapidly moved within said cylinder, said piston being connected to said first and second connecting means, and wherein said clamping means comprises a first movable clamping member and a second fixed clamping member, said second connecting means attached to said first movable clamping member and operable to move said first movable clamping member in the direction of said second fixed clamping member according to movement of said piston.

* * * * *